US011564222B2

(12) United States Patent
Uchino et al.

(10) Patent No.: US 11,564,222 B2
(45) Date of Patent: Jan. 24, 2023

(54) USER TERMINAL AND TRANSMISSION TIMING CONTROL METHOD

(71) Applicant: NTT DOCOMO, INC., Tokyo (JP)

(72) Inventors: Tooru Uchino, Tokyo (JP); Hideaki Takahashi, Tokyo (JP); Kazuki Takeda, Tokyo (JP); Tomoya Ohara, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/760,195

(22) PCT Filed: Oct. 31, 2017

(86) PCT No.: PCT/JP2017/039458
§ 371 (c)(1),
(2) Date: Apr. 29, 2020

(87) PCT Pub. No.: WO2019/087319
PCT Pub. Date: May 9, 2019

(65) Prior Publication Data
US 2021/0185653 A1 Jun. 17, 2021

(51) Int. Cl.
*H04W 72/04* (2009.01)
*H04W 74/08* (2009.01)

(52) U.S. Cl.
CPC ..... *H04W 72/044* (2013.01); *H04W 74/0833* (2013.01)

(58) Field of Classification Search
CPC ............... H04W 48/16; H04W 72/044; H04W 74/0833; H04W 56/00; H04W 56/0045;
(Continued)

(56) References Cited

U.S. PATENT DOCUMENTS 10,602,470 B2 * 3/2020 Yoon ................. H04L 27/26025
10,873,911 B2 * 12/2020 Dinan ................ H04W 52/367
(Continued)

FOREIGN PATENT DOCUMENTS

CA 3037122 C 6/2021
EP 3151625 A1 4/2017
(Continued)

OTHER PUBLICATIONS

T.Okuyama et.al.: "Antenna Deployment for 5G Ultra High-Density Distributed Antenna System at Low SHF Bands" Standards for Communications and Networking (CSCN), 2016, pp. 1-6, Nov. 2016, Berlin, Germany (6 pages).
(Continued)

*Primary Examiner* — Liton Miah
(74) *Attorney, Agent, or Firm* — Osha Bergman Watanabe & Burton LLP

(57) ABSTRACT

A terminal is disclosed including a processor that adjusts an uplink transmission timing based on granularity relative to a largest subcarrier spacing among subcarrier spacings of a plurality of uplink bandwidth parts in a same timing advance group and based on a timing advance command; and a transmitter that performs uplink transmission according to the uplink transmission timing. In other aspects, a transmission method performed by a terminal is also disclosed.

5 Claims, 10 Drawing Sheets

(58) Field of Classification Search
CPC ............. H04W 72/0453; H04W 74/08; H04L 27/26025
See application file for complete search history.

(56) References Cited

U.S. PATENT DOCUMENTS

| | | | | |
|---|---|---|---|---|
| 10,917,205 | B2* | 2/2021 | Kim | .................. H04L 5/001 |
| 11,064,401 | B2* | 7/2021 | Xiong | ................. H04W 76/11 |
| 11,284,367 | B2* | 3/2022 | Liu | .................... H04W 80/02 |
| 2016/0323070 | A1 | 11/2016 | Chen et al. | |
| 2019/0090262 | A1* | 3/2019 | Yan | ................... H04W 72/042 |
| 2019/0124691 | A1 | 4/2019 | Harada et al. | |
| 2020/0221508 | A1* | 7/2020 | Huang | ............... H04W 68/005 |
| 2021/0112599 | A1* | 4/2021 | Gao | .................... H04L 5/0053 |
| 2021/0136713 | A1 | 5/2021 | Yoon et al. | |
| 2021/0168749 | A1* | 6/2021 | Turtinen | ............ H04W 56/001 |

FOREIGN PATENT DOCUMENTS

| | | |
|---|---|---|
| EP | 3644662 A1 | 4/2020 |
| JP | 2020/504584 A | 2/2020 |
| WO | 2017179725 A1 | 10/2017 |
| WO | 2018236197 A1 | 12/2018 |

OTHER PUBLICATIONS

3GPP TS 36.321 V14.3.0 "3rd Generation Partnership Project; Technical Specification Group Radio Access Network; Evolved Universal Terrestrial Radio Access (E-UTRA); Medium Access Control (MAC) protocol specification (Release 14)" Jun. 2017 (107 pages).
3GPP TS 36.211 V13.3.0 "3rd Generation Partnership Project; Technical Specification Group Radio Access Network; Evolved Universal Terrestrial Radio Access (E-UTRA); Physical channels and modulation (Release 13)" Sep. 2016 (169 pages).
3GPP TSG RAN WG1 Meeting 90bis; R1-1719197 "Summary of Remaining Details on RACH Procedure" Qualcomm; Prague, CZ; Oct. 9-13, 2017 (29 pages).
3GPP TSG RAN WG1 Meeting 90bis; R1-1719160 "Summary of Remaining Details on RACH Procedure" Qualcomm; Prague, CZ; Oct. 9-13, 2017 (24 pages).
International Search Report issued in International Application No. PCT/JP2017/039458, dated Jan. 23, 2018 (4 pages).
Written Opinion issued in International Application No. PCT/JP2017/039458; dated Jan. 23, 2018 (5 pages).
Notice of Reasons for Refusal for Japanese Application No. 2019-550065 dated Oct. 12, 2021 (8 pages).
Office Action issued in counterpart Chinese Application No. 201780096469.1 dated Aug. 10, 2021 (29 pages).
Ericsson; "On timing advance"; 3GPP TSG-RAN WG1 #90, R1-1714452; Prague, Czech Republic, Aug. 21-25, 2017 (2 pages).
Huawei, HiSilicon; "On NR carrier aggregation"; 3GPP TSG RAN WG1 Meeting #90, R1-1712160; Prague, Czech Republic, Aug. 21-25, 2017 (11 pages).
Examination Report issued in counterpart Indian Application No. 202037022490 dated Aug. 25, 2021 (6 pages).
Samsung; "On UL Transmission Timing Aspects"; 3GPP TSG RAN WG1 Meeting 90bis, R1-1717678; Prague, CZ, Oct. 9-13, 2017 (2 pages).
Qualcomm Incorporated; "Timing advance for different numerology"; 3GPP TSG-RAN WG1 NR AdHoc #2, R1-1711208; Jun. 27-30, 2017; Qingdao, China (1 page).
Office Action issued in New Zealand Application No. 763949; dated Jul. 14, 2021 (3 pages).
Office Action issued in the counterpart Canadian Patent Application No. 3,080,482, dated Jun. 11, 2021 (7 pages).
Office Action issued in the counterpart Japanese Patent Application No. 2019-550065, dated May 18, 2021 (7 pages).
Office Action issued in the counterpart New Zealand Patent Application No. 763949, dated Apr. 15, 2021 (4 pages).
Extended European Search Report issued in counterpart European Patent Application No. 17930776.4, dated Jun. 8, 2021 (9 pages).
Office Action issued in counterpart Canadian Application No. 3,080,482 dated Mar. 3, 2022 (5 pages).
Office Action issued in counterpart Canadian Patent Application No. 3,080,482, dated Nov. 21, 2022 (4 pages).

* cited by examiner

| SCS (kHz) | Unit |
|---|---|
| 15 | $16*64 \cdot T_s$ |
| 30 | $8*64 \cdot T_s$ |
| 60 | $4*64 \cdot T_s$ |
| 120 | $2*64 \cdot T_s$ |
FIG. 11
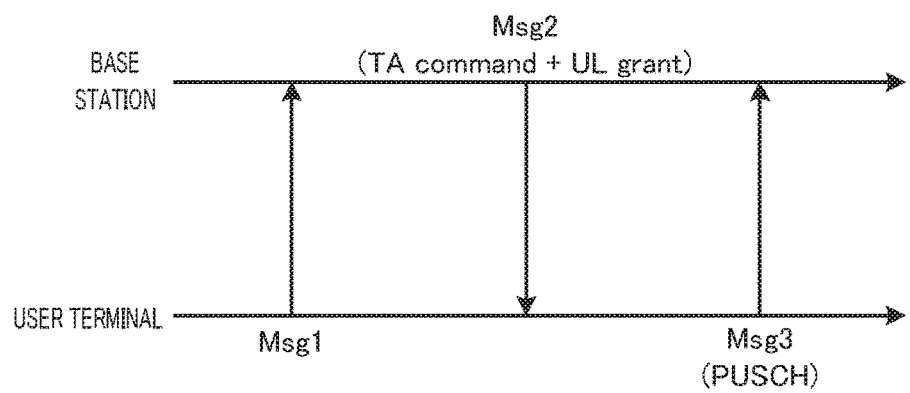
FIG. 12
| SCS ID | R | R | R | R | R | R |
|---|---|---|---|---|---|---|
| TAG ID | \multicolumn{6}{c|}{TA command} |
FIG. 13
FIG. 14
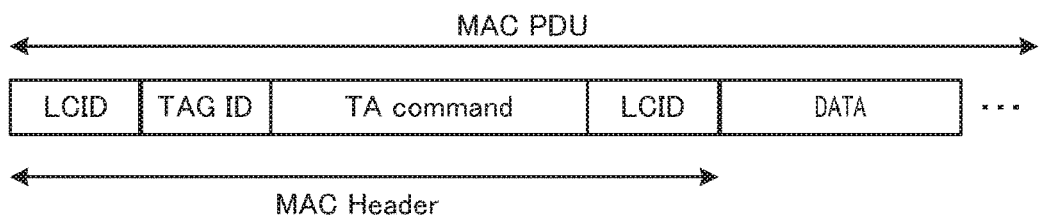
FIG. 15

| Index | LCID value |
|---|---|
| ⋮ | ⋮ |
| 111101 | TAC MAC CE for SCS#X |
| 111100 | TAC MAC CE for SCS#Y |
| ⋮ | ⋮ |

USER TERMINAL AND TRANSMISSION TIMING CONTROL METHOD

TECHNICAL FIELD

The present invention relates to a user terminal and a transmission timing control method.

BACKGROUND ART

Long Term Evolution (LTE) has been specified for achieving a higher data rate, lower latency, and the like in a Universal Mobile Telecommunications System (UNITS) network (see Non-Patent Literature (hereinafter, referred to as "NPL") 1). Successor systems of LTE have also been studied for achieving a broader bandwidth and a higher speed based on the LTE. Examples of the successor systems of the LTE include, for example, systems called LTE-Advanced (LTE-A), Future Radio Access (FRA), 5th generation mobile communication system (5G), 5G plus (5G+), New Radio Access Technology (New-RAT)), and the like.

In radio communication systems, time alignment is important to suppress symbol interference of uplink signals. NPLs 2 and 3 define Time Advance (TA) and the like used for the time alignment.

In a next generation radio communication system such as 5G, introduction of a plurality of numerologies has been considered. For example, it is considered that a plurality of Sub Carrier Spacings (SCS) is applied to an uplink signal of the next generation radio communication system.

CITATION LIST

Non-Patent Literature

NPL 1
T. Okuyama et. al.: "Antenna Deployment for 5G Ultra High-Density Distributed Antenna System at Low SHF Bands" Standards for Communications and Networking (CSCN), 2016, pp. 1-6, November 2016, Berlin, Germany
NPL 2
3GPP TS 36.321 v14.3.0, "Evolved Universal Terrestrial Radio Access (E-UTRA); Medium Access Control (MAC) protocol specification (Release 14)," June 2017
NPL 3
3GPP TS 36.211 v13.3.0, "Evolved Universal Terrestrial Radio Access (E-UTRA); Physical channels and modulation (Release 13)," September 2016

SUMMARY OF INVENTION

Technical Problem

However, there is no standard for transmission timing control of uplink signals to which the plurality numerologies is applied.

Accordingly, an object of the present invention is to provide a user terminal and a transmission timing control method for controlling a transmission timing of an uplink signal to which a plurality of numerologies is applied.

Solution to Problem

A user terminal of the present invention includes: a reception section that receives a Media Access Control Control Element (MAC CE) including a time index from a base station; a control section that adjusts a transmission timing of an uplink signal based on a value resulting from multiplication of the time index with a granularity corresponding to a signal design of the uplink signal; and a transmission section that transmits, to the base station, the uplink signal of which the transmission timing has been adjusted.

Advantageous Effects of Invention

According to the present invention, a transmission timing of an uplink signal to which a plurality of numerologies is applied can be appropriately controlled.

BRIEF DESCRIPTION OF DRAWINGS

FIG. 11 is a diagram illustrating an exemplary data configuration of a storage section;

FIG. 12 is a diagram illustrating an example of an RA procedure corresponding to the numerology of the uplink signal;

FIG. 13 is a diagram illustrates an exemplary data configuration of TA command MAC CE corresponding to the numerology of the uplink signal;

FIG. 14 is a diagram illustrating another exemplary data configuration of the TA command MAC CE corresponding to the numerology of the uplink signal;

FIG. 15 is a diagram illustrating still another exemplary data configuration of the TA command MAC CE corresponding to the numerology of the uplink signal;

DESCRIPTION OF EMBODIMENTS

Hereinafter, embodiments of the present invention will be described with reference to the accompanying drawings.

Embodiment 1

Figure 1:
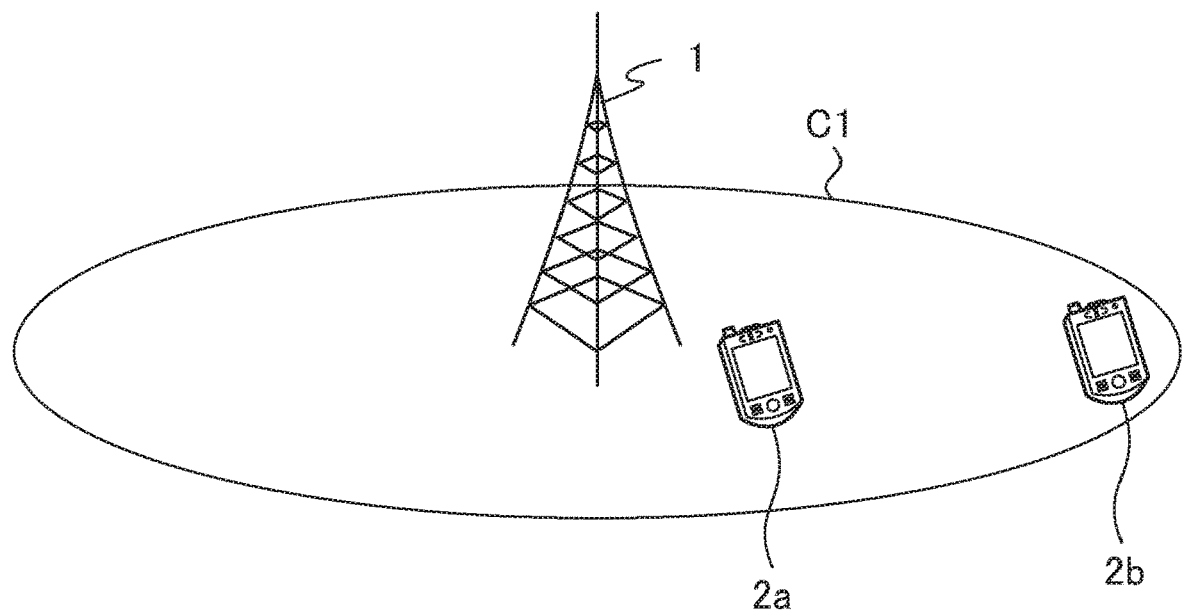
FIG. 1 is a diagram illustrating an exemplary configuration of a radio communication system according to Embodiment 1.

FIG. 1 is a diagram illustrating an exemplary configuration of a radio communication system according to Embodiment 1. As illustrated in FIG. 1, the radio communication system includes gNB 1 and UEs 2a and 2b. In FIG. 1, cell C1 formed or provided by gNB 1 is illustrated.

gNB 1 illustrated in FIG. 1 is a base station, and UEs 2a and 2b are user terminals such as a smartphone and a tablet terminal. In the radio communication system illustrated in FIG. 1, a name of the base station is gNB. However, the name of the base station is not limited to this. For example, the base station illustrated in FIG. 1 may be referred to as an eNB.

UEs 2a and 2b and gNB 1 perform radio communication, for example, based on 5G (New Radio: NR) which is a next generation radio communication system. The numerology is applied to the radio communication between gNB 1 and UEs 2a and 2b, and for example, a plurality of SCSs is applied to the uplink signals of UEs 2a and 2b (for example, refer to FIGS. 8A and 8B).

Note that, the numerology indicates a design of a signal in a certain Radio Access Technology (RAT) or a set of communication parameters characterizing the design of the RAT. Here, it is assumed that the numerology indicate the SCS or an Orthogonal Frequency Division Multiplexing (OFDM) symbol length.

gNB 1 receives the uplink signals transmitted from UEs 2a and 2b located in cell C1, and collectively performs fast Fourier transform (FFT). After that, gNB 1 demodulates the uplink signal of each of UEs 2a and 2b. UEs 2a and 2b are positioned at various positions in cell C1, for example, positioned near gNB 1 or positioned at a cell end of cell C1. Therefore, even if the uplink signals are simultaneously transmitted from UEs 2a and 2b, for example, due to propagation delay, the uplink signals reach gNB 1 at different times.

When a difference between arrival times of the uplink signals of UE 2a and UE 2b to gNB 1 exceeds a time width of Cyclic Prefix (CP), the uplink signal of UE 2a and the uplink signal of LE 2b may cause an inter-symbol interference. To avoid this problem, gNB 1 notifies UEs 2a and 2b of a Timing advance (TA) command and makes the uplink signals transmitted from UEs 2a and 2b simultaneously (including substantially simultaneous) reach gNB 1.

Figure 2:
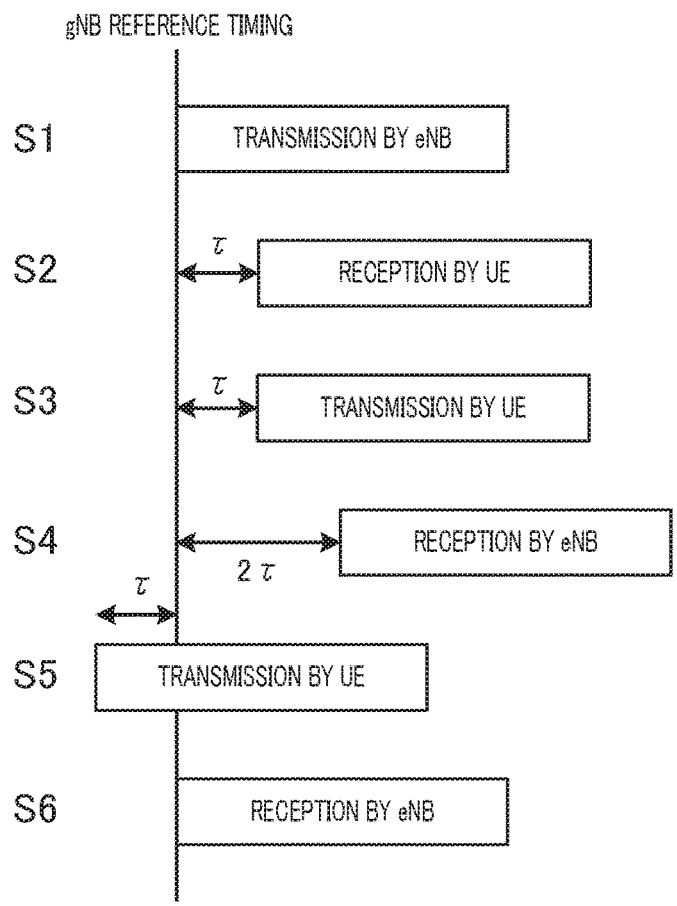
FIG. 2 is a diagram for explaining an example of time alignment of an uplink signal.

FIG. 2 is a diagram for explaining an example of time alignment of the uplink signal. First, gNB 1 transmits a downlink signal to UE 2a (step S1). The downlink signal reaches UE 2a with a propagation delay of which a length is τ (step S2).

When receiving the downlink signal in step S2, UE 2a transmits an uplink signal (step S3). The uplink signal reaches gNB 1 with the propagation delay of which the length is τ. Therefore, after transmitting the downlink signal in step S1, gNB 1 receives the uplink signal after a period of 2τ has elapsed (step S4). Although not illustrated in FIG. 2, gNB 1 measures a difference (2τ) between a transmission timing of the downlink signal in step S1 and a reception timing of the uplink signal of UE 2a and notifies UE 2a of a TA command indicating the period.

UE 2a transmits an uplink signal at a timing preceding a reference timing of UE 2a (downlink reception timing) by the notified TA command (step S5). As a result, gNB 1 can receive the uplink signal from UE 2a at the reference timing of LTE 2a (step S6).

Furthermore, gNB 1 performs the above processing on UE 2b. Therefore, gNB 1 can simultaneously receive the uplink signals transmitted from UEs 2a and 2b.

As methods for notifying the user terminal of the TA command, the following two methods will be described.

1. Random Access Response (RAR)
2. Media Access Control Control Element (TA command MAC CE)

First, notification of the TA command using the RAR will be described.

Figure 3:
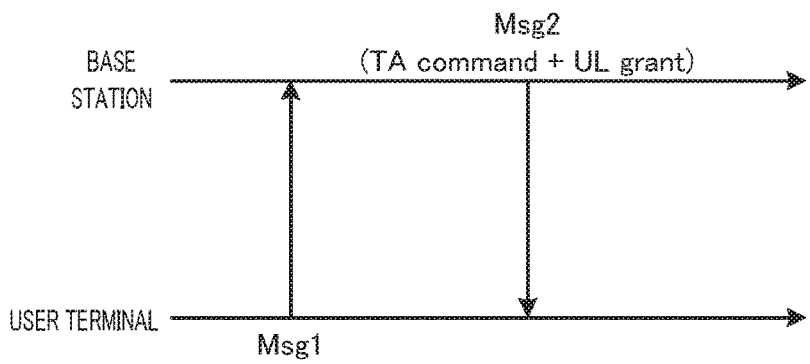
FIG. 3 is a diagram illustrating an example of an RA procedure.

FIG. 3 is a diagram illustrating an example of an RA procedure. The user terminal selects one of preamble indexes which can be used as an RA preamble and transmits the RA preamble to the base station (Msg1). The preamble index is an identifier of the RA preamble transmitted b the user terminal and is referred to as a signature.

The base station transmits a response, which is a response to the RA preamble, to the user terminal (Msg2). The RA response includes a TA command and UL grant.

The user terminal determines what is the preamble index (not illustrated) included in the RA response to determine whether or not the response to the transmitted RA preamble can be received. When the response to the transmitted RA preamble can be received, the user terminal controls a transmission timing of the uplink signal based on the TA command included in the RA response.

As described above, the TA command is notified to the user terminal in Msg2 of the RA procedure. Note that, the TA command is an index and is converted into time as will be described later (refer to FIG. 7).

Figure 4:
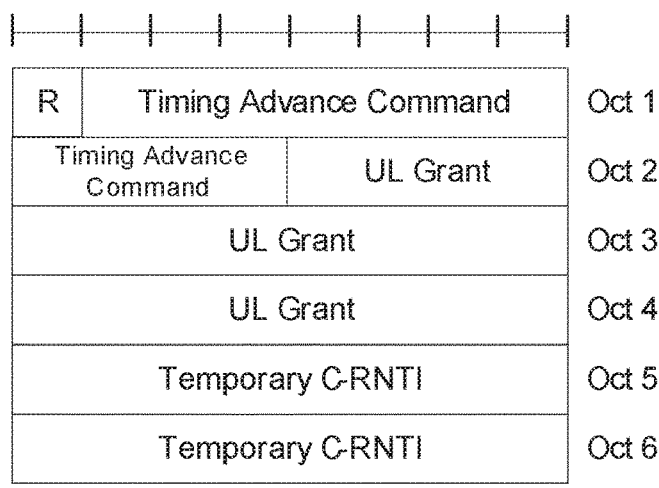
FIG. 4 is a diagram illustrating an exemplary data configuration of MAC RAR.

FIG. 4 is a diagram illustrating an exemplary data configuration of MAC RAR. A MAC Protocol Data Unit (PDU) of the RA includes a MAC header and a MAC RAR subsequent to the MAC header.

As illustrated in FIG. 4, the MAC RAR has a field of the TA command (Timing Advance Command illustrated in FIG. 4). The TA command is notified from the base station to the user terminal in the field of the TA command illustrated in FIG. 4. The user terminal controls the transmission timing of the uplink signal based on the TA command of the MAC RAR notified from the base station.

Next, notification of the TA command using the TA command MAC CE will be described.

Figure 5:
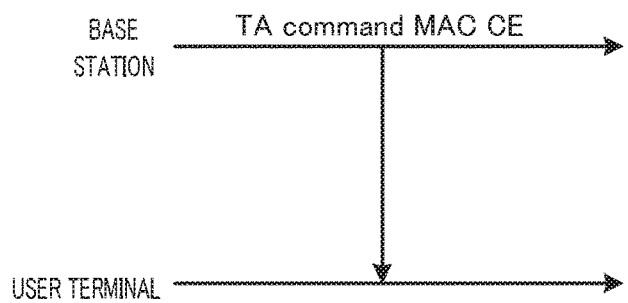
FIG. 5 is a diagram illustrating an example of a notification of a TA command using TA command MAC CE.

FIG. 5 is a diagram illustrating an example of the notification of the TA command using the TA command MAC CE. As illustrated in FIG. 5, the TA command MAC CE is transmitted from the base station to the user terminal. The TA command MAC CE includes a TA command, and the TA command is periodically transmitted from the base station to the user terminal, for example.

Figure 6:
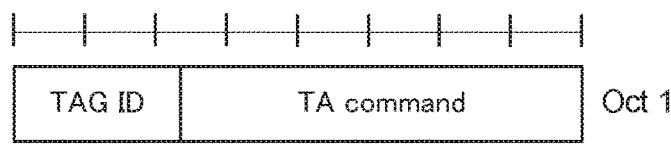
FIG. 6 is a diagram illustrating an exemplary data configuration of the TA command MAC CE.

FIG. 6 is a diagram illustrating an exemplary data configuration of the TA command MAC CE. The MAC PDU of the TA command includes the MAC header, the TA command MAC CE subsequent to the MAC header, and a Service Data Unit (SDU) subsequent to the TA command MAC CE.

As illustrated in FIG. 6, the TA command MAC CE includes a field of a TA Group (TAG) ID and a field of the TA command. The TA command is notified from the base station to the user terminal in the field of the TA command illustrated in FIG. 6. The user terminal controls the transmission timing of the uplink signal based on the TA command of the TA command MAC CE notified from the base station.

As described above, the TA command is notified to the user terminal by the TA command MAC CE.

Figure 7:
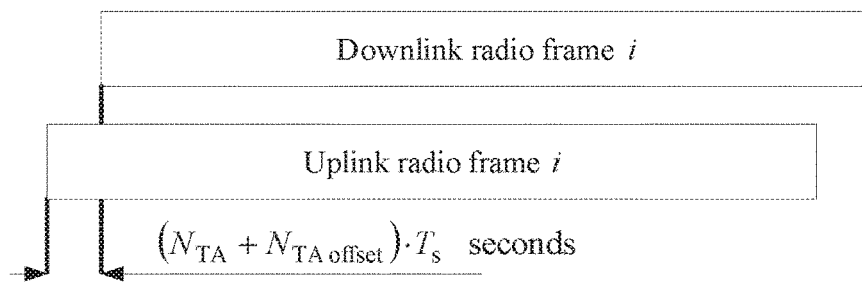
FIG. 7 is a diagram for explaining conversion from the TA command into time.

FIG. 7 is a diagram for explaining conversion from the TA command to time. The user terminal transmits the uplink signal to the base station at a timing preceding by the TA command notified from the base station. For example, the user terminal transmits the uplink signal to the base station as preceding the uplink signal by a time expressed by following equation 1.

$$T_{adj} = (N_{TA} + N_{TA\ offset}) \cdot T_s \quad (1)$$

The value of $N_{TA\ offset}$ expressed by equation 1 changes depending on a type of a frame structure of the uplink signal. The value of $N_{TA}$ is a value corresponding to the TA command (index). The value of $T_s$ is a value that is obtained by converting $N_{TA\ offset}$ and $N_{TA}$ which are index values into time. The value of $T_s$ is expressed by following equation 2, for example.

$$T_s = 1/(15000 \times 2048) \quad (2)$$

As described above, the TA command is transmitted from the base station to the user terminal by the MAC RAR or the MAC CE. Therefore, the user terminal can calculate time used to adjust the transmission timing of the uplink signal by using equations 1 and 2 and adjust the transmission timing of the uplink signal.

As described in FIG. 1, in the NR radio communication system, the plurality of numerologies (SCS) is applied to the uplink signal.

Figure 8A:
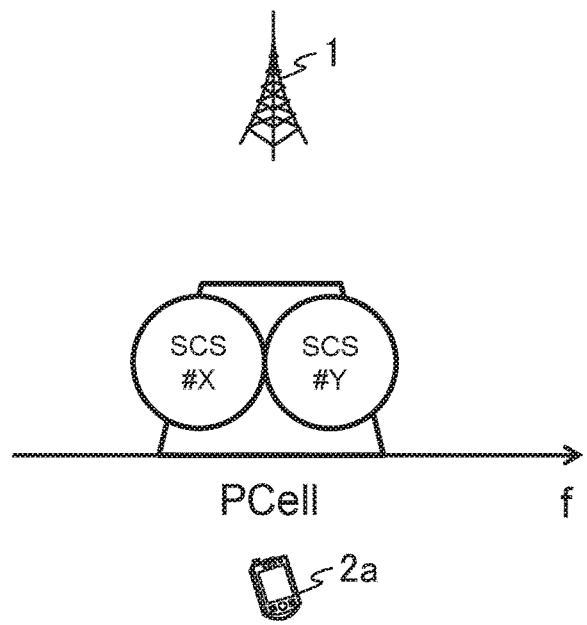
FIG. 8A is a diagram for explaining an example of numerology.
Figure 8B:
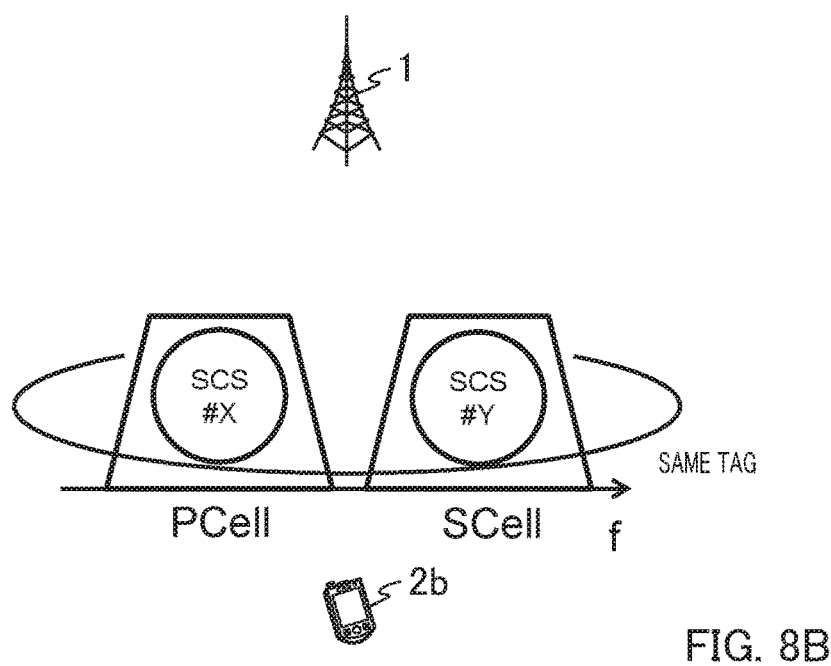
FIG. 8B is a diagram for explaining an example of the numerology.

FIGS. 8A and 8B are diagrams for explaining an example of the numerology. In FIG. 8A, UE 2a transmits the uplink signal to gNB 1 with a Primary Cell (PCell). UE 2a sets the SCSs of all the subcarriers of the PCell to SCS #X at a certain time and sets the SCSs of all the subcarriers of the PCell to SCS #Y at another time. That is, UE 2a changes the SCS of the subcarrier of the PCell depending on the time. SCS #X and SCS #X have a value of, for example, 15 kHz, 30 kHz, 60 kHz, and 120 kHz (SCS #X≠SCS #X). Note that, UTE 2a may set the SCS of a part of the subcarriers of the Pcell to SCS #X and may set the SCS of other subcarrier of the Pcell to SCS #Y.

In FIG. 8B, UE 2b transmits the uplink signals to gNB 1 with the PCell and a Secondary Cell (SCell). UE 2b sets the SCS of the subcarrier of the PCell to SCS #X and sets the SCS of the subcarrier of the SCell to SCS #Y.

In FIG. 8B, the PCell and the SCell belong to the same TAG. Therefore, in a case of FIG. 8B, transmission timings of the uplink signal of the PCell and the uplink signal of the SCell are controlled based on the same TA command.

Here, the OFDM symbol length of the uplink signal changes according to the SCS. For example, if the SCS is large, the OFDM symbol length becomes short, and if the SCS is small, the OFDM becomes long.

An uplink signal having a short OFDM symbol length requires stricter time alignment than an uplink signal having a long OFDM symbol length. For example, with respect to a difference in the time alignment, even if the uplink signal having the long OFDM symbol length does not cause a symbol interference, the uplink signal having the short OFDM symbol length may cause the symbol interference.

Therefore, in the radio communication system illustrated in FIG. 1, a granularity of the TA command (width of one index of TA command) is changed according to SCSs #X and #Y (according to OFDM symbol length).

For example, in examples in FIGS. 8A and 8B, it is assumed that "SCS #X<SCS #Y" be satisfied. In this case, the radio communication system in FIG. 1 sets "granularity of TA command of uplink signal of SCS #X>granularity of TA command of uplink signal of SCS #Y" (that is, granularity of TA command of uplink signal of SCS #X is coarser than that of SCS #Y).

Note that regardless of SCS #X and SCS #Y, it is assumed that the TA command having the same granularity be applied to the uplink signal of SCS #X and the uplink signal of SCS #Y. In this case, for example, since the transmission timing of the uplink signal of SCS #Y having the shorter OFDM symbol length than the uplink signal of SCS #X is not controlled based on a fine time unit, the symbol interference may be caused.

Figure 9:
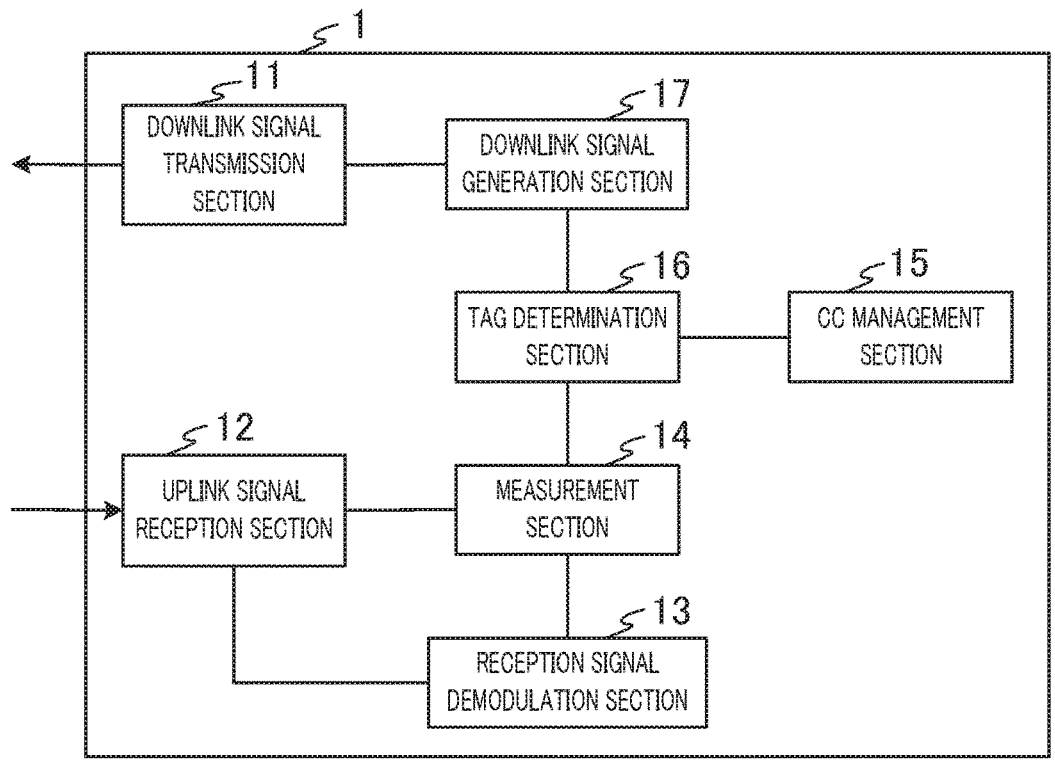
FIG. 9 is an exemplary block configuration of a gNB.

FIG. 9 is an exemplary block configuration of gNB 1. In FIG. 9, functional sections or processing sections related to the embodiment of functional sections and processing sections included in gNB 1 are representatively illustrated. As illustrated in FIG. 9, gNB 1 includes downlink signal transmission section 11, uplink signal reception section 12, reception signal demodulation section 13, measurement section 14, Component Carrier (CC) management section 15, TAG determination section 16, and downlink signal generation section 17.

Downlink signal transmission section 11 performs processing for transmitting the downlink signals to UEs 2a and 2b. For example, downlink signal transmission section 11 transmits a message such as an RAR including a TA command, a MAC CE including a TA command, and a Radio Resource Control (RRC) connection reconfiguration to UEs 2a and 2b.

Uplink signal reception section 12 performs processing for receiving the uplink signals from UEs 2a and 2b. For example, uplink signal reception section 12 receives an RA preamble, a Physical Uplink Control Channel (PUCCH), a Physical Uplink Shared Channel (PUSCH), Sounding Reference Symbols (SRS), and the like.

Reception signal demodulation section 13 demodulates control data and user data included in the received signal.

Measurement section 14 measures a reception timing of the uplink signal, reception quality for each CC, and the like.

CC management section 15 manages a CC currently used by UEs 2a and 2b, a CC which can be used by UEs 2a and 2b, and the like.

TAG determination section 16 determines whether or not to change the TAG and how to change the TAG based on the measurement result by measurement section 14.

Downlink signal generation section 17 generates downlink signals to be transmitted to UEs 2a and 2b. For example, downlink signal generation section 17 generates a message such as an RA response including a TA command and an RRC connection reconfiguration.

Figure 10:
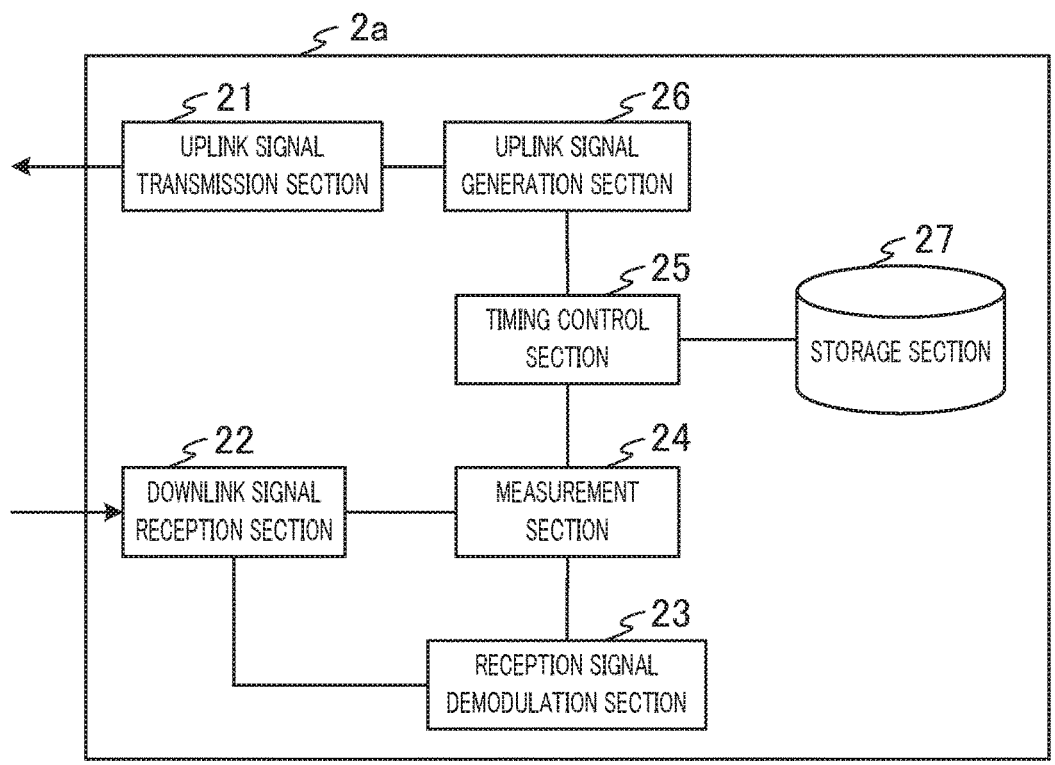
FIG. 10 is an exemplary block configuration of an UE.

FIG. 10 is an exemplary block configuration of UE 2a. In FIG. 10, functional sections or processing sections related to the embodiment of functional sections and processing sections included in UE 2a are representatively illustrated. As illustrated in FIG. 10, UE 2a includes uplink signal transmission section 21, downlink signal reception section 22, reception signal demodulation section 23, measurement section 24, timing control section 25, uplink signal generation section 26, and storage section 27.

Uplink signal transmission section 21 performs processing for transmitting an uplink signal to gNB 1. For example, uplink signal transmission section 21 transmits an RA preamble, a PUCCH, a PUSCH, SRS, and the like.

Downlink signal reception section 22 performs processing for receiving a downlink signal from gNB 1. For example, downlink uplink signal reception section 22 receives a message such as an RAR including a TA command, a MAC CE including a TA command, and an RRC connection reconfiguration.

Reception signal demodulation section 23 demodulates control data and user data included in the received signal. Measurement section 24 measures reception quality of the downlink signal and the like. The reception quality is, for example, used for demodulation of the reception signal and also transmitted to gNB 1.

Timing control section 25 controls the transmission timing of the uplink signal. For example, timing control section 25 controls the transmission timing of the uplink signal based on the TA command and a granularity of the TA command to be described below.

Uplink signal generation section 26 generates an uplink signal to be transmitted to gNB 1. For example, uplink signal generation section 26 generates an RA preamble, a Physical Uplink Control Channel (PUCCH), a Physical Uplink Shared Channel (PUSCH), SRS, and the like.

Storage section 27 stores data used for performing various operations by UE 2a. For example, storage section 27 stores the SCS and the granularity of the TA command in association with each other. In the above description, the exemplary block configuration of UE 2a has been described. However, UE 2b has a similar block configuration.

FIG. 11 is a diagram illustrating an exemplary data configuration of storage section 27. As illustrated in FIG. 11, storage section 27 stores the SCS and the granularity of the TA command (Unit in FIG. 11) in association with each other. The granularity of the TA command indicates, for example, a value (width) obtained by converting an index of "one" which is the minimum unit of the TA command.

The TA command transmitted from gNB 1 is multiplied by the granularity. As described above, the TA command is an index, and by multiplying the granularity, a width of one index coarseness is converted.

As illustrated in FIG. 11, the granularity of the TA command decreases as the SCS increases. In other words, the granularity of the TA command decreases as the OFDM symbol length is shortened.

Timing adjustment in the RAR will be described.

FIG. 12 is a diagram illustrating an example of an RA procedure corresponding to the numerology of the uplink signal. Since processing of Msg1 and Msg2 illustrated in FIG. 11 is similar to the processing of Msg1 and Msg2 described with reference to FIG. 3, description of the processing will be omitted.

UE 2a determines the SCS of the uplink signal (PUSCH) used for transmitting Msg3. UE 2a obtains the granularity of the TA command corresponding to the determined SCS of the uplink signal with reference to storage section 27. UE 2a calculates a transmission timing adjustment time of the uplink signal from the granularity obtained by referring to storage section 27 and the TA command received with Msg2. UE 2a adjusts the transmission timing of the uplink signal using the calculated transmission timing adjustment time. In the above, UE 2a has been described. The same applies to UE 2b.

In this way, UEs 2a and 2b calculate the transmission timing adjustment time according to the SCS and adjust the transmission timing of the uplink signal.

Timing adjustment using the TA command MAC CE will be described.

FIG. 13 is a diagram illustrating an exemplary data configuration of a TA command MAC CE corresponding to the numerology of the uplink signal. As illustrated in FIG. 13, the TA command MAC CE includes a field of the TA command and a field of an SCS ID. In the field of the SCS ID, an identifier for identifying the SCS of the uplink signal to which the TA command is applied is stored.

For example, UE 2a periodically receives the TA command MAC CE from gNB 1. The received TA command MAC CE has an exemplary data configuration as illustrated in FIG. 13.

When receiving the TA command MAC CE from gNB 1, UE 2a refers to storage section 27 and obtains the granularity of the TA command to the SCS ID included in the received TA command MAC CE. For example, the SCS ID included in the TA command MAC CE indicates any one of the SCSs illustrated in FIG. 11, and UE 2a obtains the granularity of the TA command corresponding to the SCS indicated by the SCS ID. Note that, association of the SCS ID with the SCS (or granularity of TA command of uplink signal of SCS) can be set in any layer such as an RRC layer, a MAC layer, and a physical layer.

UE 2a calculates a transmission timing adjustment time of the uplink signal from the granularity obtained by referring to storage section 27 and the TA command included in the TA command MAC CE received from gNB 1. UE 2a adjusts the transmission timing of the uplink signal using the calculated transmission timing adjustment time. In the above, UE 2a has been described. The same applies to UE 2b.

In this way, UEs 2a and 2b calculate the transmission timing adjustment time according to the SCS and adjust the transmission timing of the uplink signal.

(Modification 1)

In FIG. 13, a new field called as the SCS ID is provided in the TA command MAC CE. On the other hand, a part of the existing field of the TA command may be used as a field of the identifier for identifying the SCS without providing the new field in the TA command MAC CE.

FIG. 14 is a diagram illustrating another exemplary data configuration of the TA command MAC CE corresponding to the numerology of the uplink signal. As illustrated in FIG. 14, the MAC CE includes a field of the TA command. In the MAC CE illustrated in FIG. 14, a part of the field of the TA command is a field indicating the SCS ID. For example, the field indicated by a dotted line in FIG. 14 is the field indicating the SCS ID.

In this way, gNB 1 may notify UEs 2a and 2b of the SCS ID using the existing field of the TA command.

(Modification 2)

FIG. 15 is a diagram illustrating still another exemplary data configuration of the TA command MAC CE corresponding to the numerology of the uplink signal. As illustrated in FIG. 15, the MAC PDU includes a field of a Logical Channel ID (LCID). The LCID is an identifier indicating a data type of a subsequent field.

Figures 16, 17:
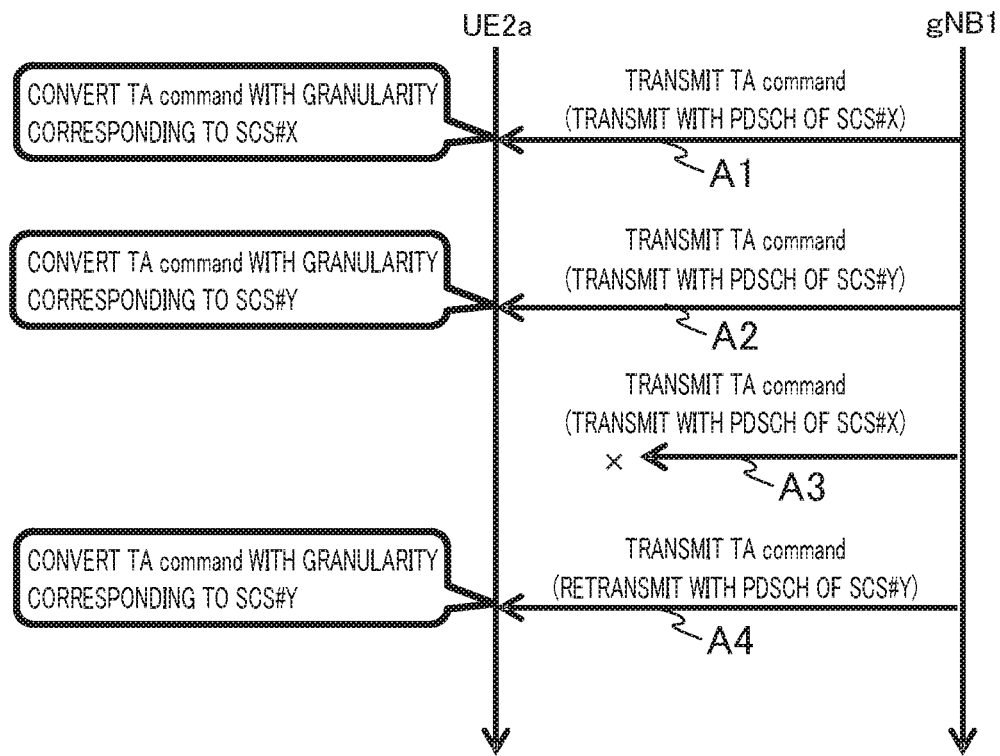
FIG. 16 is a diagram illustrating an example of LCID values.
FIG. 17 is a diagram for explaining an exemplary operation of a radio communication system according to Embodiment 2.

FIG. 16 is a diagram illustrating an example of an LCID value. Index illustrated in FIG. 16 indicates a possible value of the LCID. The LCID value indicates the data type of the field subsequent to the field of the LCID.

For example, in a case where the LCID is "11101", it is indicated that a TAG ID and a TA command are stored in the field subsequent to the LCID (refer to FIG. 15). Furthermore, it is indicated that the TAG ID and the TA command in the field subsequent to the LCID are a TAG ID and a TA command of the uplink signal of SCS #X.

In addition, for example, in a case where the LCID is "11100", it is indicated that a TAG ID and a TA command are stored in the field subsequent to the LCID (refer to FIG. 15). Furthermore, it is indicated that the TAG ID and the TA command in the field subsequent to the LCID are a TAG ID and a TA command of the uplink signal of SCS #Y.

In this way, gNB 1 may designate the data type of the field subsequent to the LCID and the SCS to which the TAG ID and the TA command are applied by using the LCID.

In FIG. 15, the TAG ID and the TA command are stored in the MAC header. However, the TAG ID and the TA command may be stored in a MAC CE of a payload subsequent to the MAC header.

(Modification 3)

The SCS ID may be notified to UEs 2a and 2b with a Net Work (NW) control signal. For example, the SCS ID may be notified to UEs 2a and 2b by using notification information and an RRC individual control signal.

As described above, UEs 2a and 2b receive the TA command MAC CE including the TA command for adjusting the transmission timing of the uplink signal and identification information for identifying the SCS of the uplink signal from gNB 1. UEs 2a and 2b calculate the transmission timing adjustment time of the uplink signal based on a value obtained by multiplying the TA command with the granularity corresponding to the SCS. Then, UEs 2a and 2b adjust the transmission timing of the uplink signal based on the transmission timing adjustment time and transmits the transmission timing to gNB 1.

As a result, UEs 2a and 2b can appropriately control the transmission timing of the uplink signal to which the plurality of numerologies is applied.

Furthermore, as illustrated in FIG. 13, by providing a new field of the SCS ID in the TA command MAC CE and notifying the SCS ID to UEs 2a and 2b, the radio communication system can dynamically change the TA command.

Furthermore, as illustrated in FIG. 14, by notifying the SCS ID to UEs 2a and 2b by using the existing field, the radio communication system can dynamically change the TA command and can suppress an overhead of data transmission.

Furthermore, as illustrated in FIGS. 15 and 16, by notifying the SCS ID to UEs 2a and 2b by using the LCID without providing the new field in the TA command MAC CE, the radio communication system can dynamically change the TA command and can suppress the overhead of the data transmission.

In addition, by notifying the SCS ID to UEs 2a and 2b with the NW control signal, the radio communication system can dynamically change the TA command MAC CE and can suppress the overhead of the data transmission.

Embodiment 2

Hereinafter, Embodiment 2 will be described. In Embodiment 2, a granularity of a TA command is designated by a SCS of a downlink signal. Hereinafter, parts different from Embodiment 1 will be described.

FIG. 17 is a diagram for explaining an exemplary operation of a radio communication system according to Embodiment 2. gNB 1 designates an uplink signal of the SCS to which the TA command is applied by an SCS of a PDSCH including a TA command MAC CE. Then, UE 2a refers to storage section 27 based on the received SCS of the PDSCH and obtains the granularity of the TA command included in the received TA command MAC CE.

For example, as indicated by arrow A1 in FIG. 17, gNB 1 transmits the TA command (TA command MAC CE) to UE 2a with the PDSCH of SCS #X. UE 2a determines the SCS #X of the received PDSCH. UE 2a refers to storage section 27 and obtains the granularity of the TA command corresponding to the determined SCS #X. For example, in a case where the SCS #X is "15 kHz", in the example illustrated in FIG. 11, UE 2a obtains a granularity "$16*64 \cdot T_s$". With this operation, UE 2a can calculate a transmission timing adjustment time of the uplink signal of the SCS #X from the TA command received from gNB 1 and the obtained granularity.

Furthermore, for example, as indicated by arrow A2 in FIG. 17, gNB 1 transmits the TA command to UE 2a with a PDSCH of SCS #Y. UE 2a determines the SCS #Y of the PDSCH which has been received. UE 2a refers to storage section 27 and obtains the granularity of the TA command corresponding to determined SCS #Y. For example, in a case where SCS #Y is "30 kHz", in the example illustrated in FIG. 11, UE 2a obtains a granularity "$8*64 \cdot T_s$". With this operation, UE 2a can calculate a transmission timing adjustment time of the uplink signal of SCS #Y from the TA command received from gNB 1 and the obtained granularity.

For example, as indicated by arrow A4 in FIG. 17, gNB 1 transmits a TA command which is a different value from the TA command indicated by the arrow A2 to UE 2a with the PDSCH of SCS #Y. UE 2a determines the SCS #Y of the PDSCH which has been received. UE 2a refers to storage section 27 and obtains the granularity of the TA command corresponding to determined SCS #Y. Accordingly, UE 2a can update (change) the transmission timing adjustment time of the uplink signal of SCS #Y.

Note that, in the arrow A3 in FIG. 17, transmission of the PDSCH of SCS #X fails. In this case, the transmission timing adjustment time of the uplink signal of SCS #X of UE 2a is not updated. In the above, UE 2a has been described. However, the same applies to UE 2b.

As described above, UEs 2a and 2b receive the TA command MAC CE including the TA command for adjusting the transmission timing of the uplink signal and identification information for identifying the SCS of the uplink signal from gNB 1. UEs 2a and 2b determine an SCS of a PDSCH that has conveyed the TA command MAC CE. UEs 2a and 2b calculate the transmission timing adjustment time of the uplink signal based on a value obtained by multiplying the TA command with the granularity corresponding to the determined SCS. Then, UEs 2a and 2b adjust the transmission timing of the uplink signal based on the transmission timing adjustment time and transmits the transmission timing to gNB 1.

As a result, UEs 2a and 2b can appropriately control the transmission timing of the uplink signal to which the plurality of numerologies is applied. Furthermore, the radio communication system can dynamically change the TA command. In addition, since the radio communication system does not need to provide a new field for notifying an SCS ID to the TA command MAC CE, an overhead of data transmission can be suppressed.

Note that, in the above, UEs 2a and 2b obtain the granularity of the TA command included in the received TA command MAC CE based on the received SCS of the PDSCH. However, the present invention is not limited to this. For example, UEs 2a and 2b may obtain the granularity of the TA command based on an SCS of BandWidth Parts (BWP) or a PDCCH corresponding to the PDSCH.

Furthermore, in a case where Hybrid ARQ (HARQ) of the PDCSH is retransmitted with a different SCS, UEs 2a and 2b may obtain the granularity of the TA command by the SCS of the HARQ in the initial transmission.

Embodiment 3

Hereinafter, Embodiment 3 will be described. In Embodiment 3, UEs 2a and 2b obtains a granularity of a TA command notified after an RA procedure based on an SCS of Msg3 transmitted to gNB 1 in the recent RA procedure (performed at last time). Hereinafter, parts different from Embodiment 1 will be described.

Figure 18:
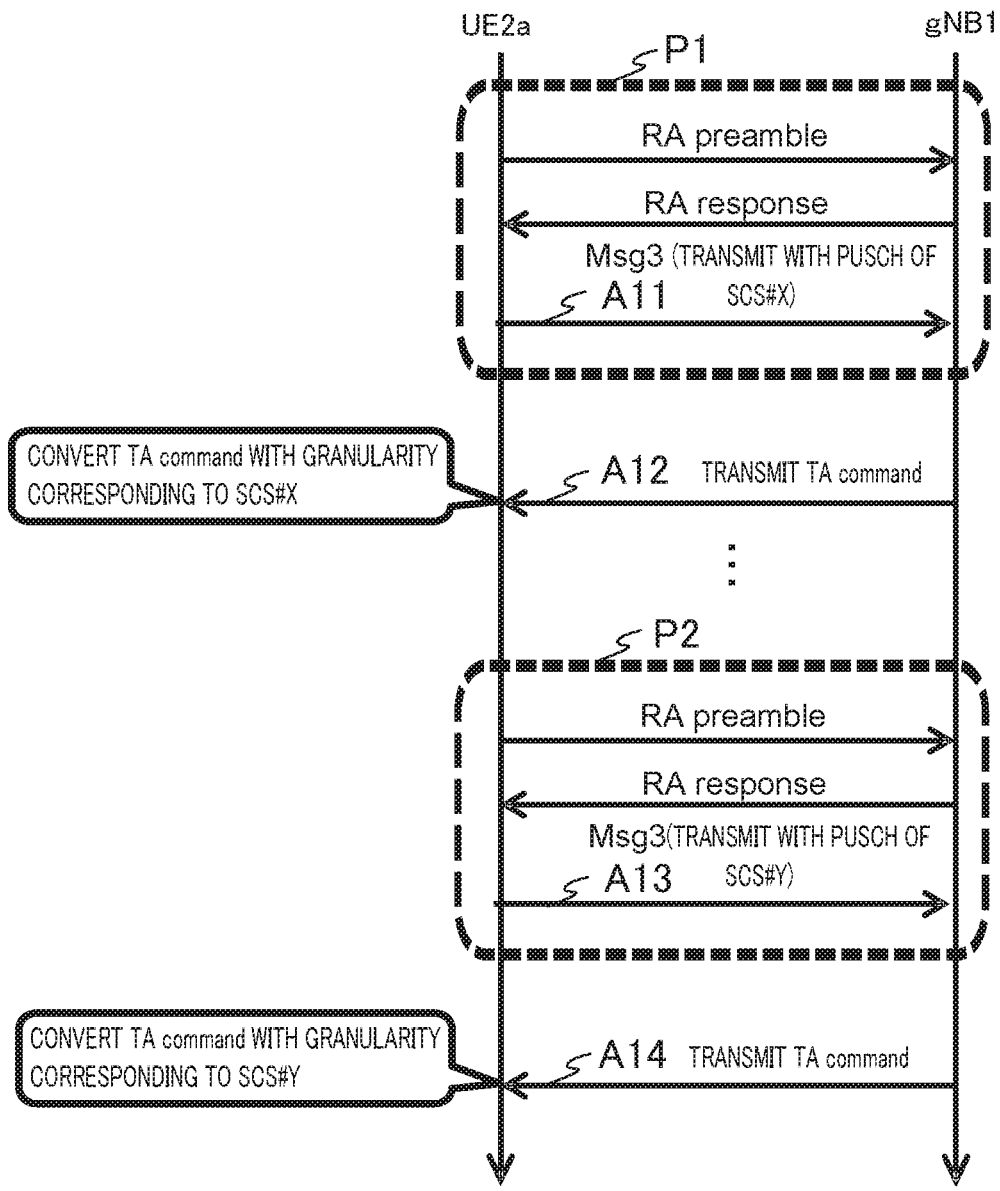
FIG. 18 is a diagram for explaining an exemplary operation of a radio communication system according to Embodiment 3.

FIG. 18 is a diagram for explaining an exemplary operation of a radio communication system according to Embodiment 3. In FIG. 18, RA procedures P1 and P2 are illustrated. UE 2a obtains a granularity of a TA command notified after RA procedures P1 and P2 based on an SCS of Msg3 transmitted in recent RA procedures P1 and P2.

For example, as indicated by arrow A11, UE 2a transmits Msg3 in RA procedure P1 with a PUSCH of SCS #X. UE 2a stores SCS #X of the PUSCH with which Msg3 is transmitted in storage section 27.

UE 2a receives the TA command (TA command MAC CE) from gNB 1 as indicated by arrow A12 in FIG. 18. In this case, UE 2a obtains SCS #X stored in storage section 27 (SCS of Msg3 transmitted in recent RA procedure P1). UE 2a refers to storage section 27 (for example, refer to FIG. 11) and obtains the granularity of the TA command corresponding to obtained SCS #X. With this operation, UE 2a can calculate a transmission timing adjustment time of the uplink signal of the SCS #X from the TA command received from gNB 1 and the obtained granularity.

Furthermore, for example, UE 2a transmits Msg3 in RA procedure P2 with the PUSCH of SCS #Y as indicated by arrow A13. UE 2a stores SCS #Y of the PUSCH with which Msg3 is transmitted in storage section 27.

UE 2a receives the TA command (TA command MAC CE) from gNB 1 as indicated by arrow A14 in FIG. 18. In this case, UE 2a obtains SCS #Y stored in storage section 27 (SCS of Msg3 transmitted in recent RA procedure P2). UE 2a refers to storage section 27 (for example, refer to FIG. 11) and obtains the granularity of the TA command corresponding to obtained SCS #Y. With this operation, UE 2a can calculate a transmission timing adjustment time of the uplink signal of SCS #Y from the TA command received from gNB 1 and the obtained granularity. In the above, UE 2a has been described. The same applies to UE 2b.

As described above, UEs 2a and 2b store the SCS of Msg3 transmitted to gNB 1 in the recent RAP. After the RAP, UEs 2a and 2b receive the TA command MAC CE including the TA command from gNB 1. UEs 2a and 2b calculate a transmission timing adjustment time of an uplink signal based on a value obtained by multiplying the received TA command with the granularity corresponding to the stored SCS of Msg3. Then, UEs 2a and 2b adjust the transmission timing of the uplink signal based on the transmission timing adjustment time and transmits the transmission timing to gNB 1.

As a result, UEs 2a and 2b can appropriately control the transmission timing of the uplink signal which the plurality of numerologies is applied. Furthermore, the radio communication system can dynamically change the TA command. In addition, since the radio communication system does not need to provide a new field for notifying an SCS ID to the TA command MAC CE, an overhead of data transmission can be suppressed.

Embodiment 4

Hereinafter, Embodiment 4 will be described. In Embodiment 4, a granularity of a TA command is designated by the multiplexing number of TA command MAC CEs included in a MAC PDU. Hereinafter, parts different from Embodiment 1 will be described.

Figure 19:
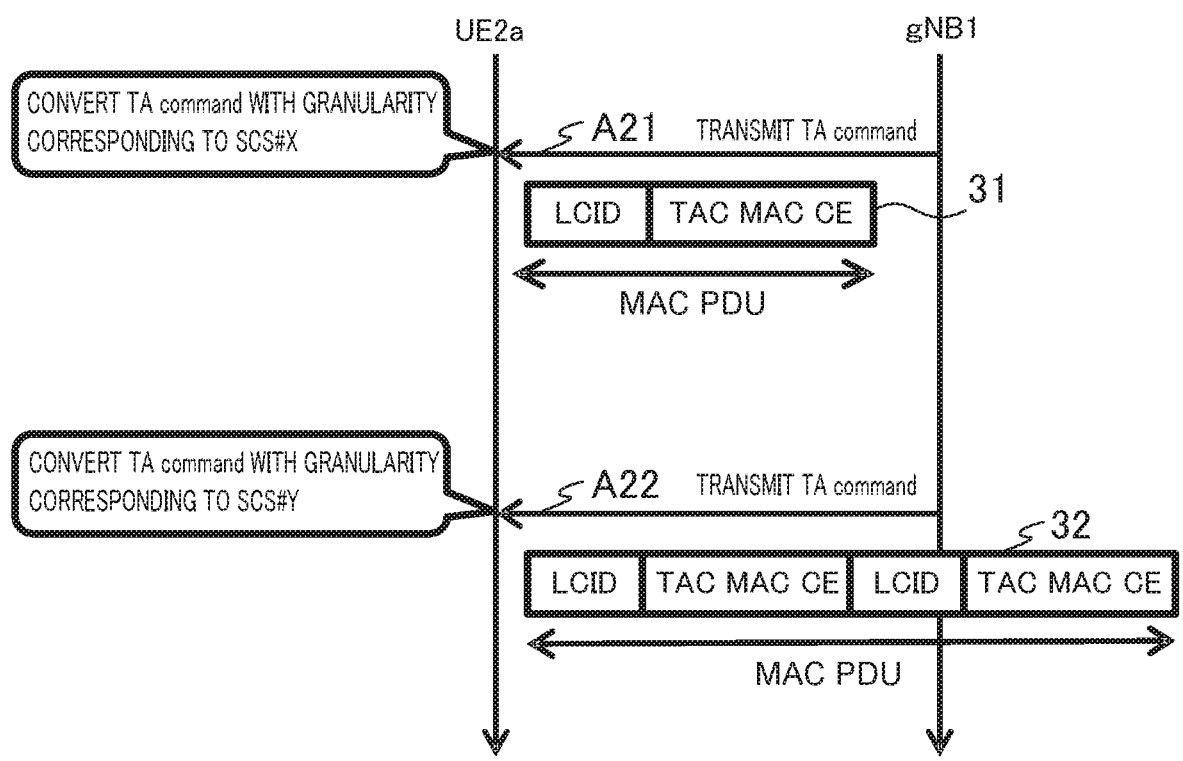
FIG. 19 is a diagram for explaining an exemplary operation of a radio communication system according to Embodiment 4.

FIG. 19 is a diagram for explaining an exemplary operation of a radio communication system according to Embodiment 4. In FIG. 19, MAC PDUs 31 and 32 are illustrated. UE 2a obtains the granularity of the TA command based on the multiplexing number of the TA command MAC CEs included in MAC PDUs 31 and 32. Storage section 27 stores the multiplexing number of TA command MAC CEs and the granularity of the TA command in association with each other. For example, a field of "SCS" illustrated in FIG. 11 indicates the multiplexing number of TA command MAC CEs.

For example, as indicated by arrow A21 in FIG. 19, gNB 1 transmits the TA command to UE 2a. At this time, as indicated by MAC PDU 31, gNB 1 also transmits a single TA command MAC CE (multiplex number is one) to UE 2a.

UE 2a determines the multiplexing number of TA command MAC CEs included in MAC PDU 31 which has been received. Since MAC PDU 31 includes the single TA command MAC CE, it is determined that the multiplexing number is one. UE 2a refers to storage section 27 and obtains the granularity of the TA command corresponding to the determined multiplexing number of one. With this operation, for example, UE 2a can calculate a transmission timing adjustment time of an uplink signal of SCS #X from the TA command received from gNB 1 and the obtained granularity.

For example, as indicated by arrow A22 in FIG. 19, gNB 1 transmits the TA command to UE 2a. At this time, as indicated by MAC PDU 32, gNB 1 transmits two TA command MAC CEs (multiplex number is two) to UE 2a. Note that the TA command MAC CEs multiplexed in MAC PDU 32 store the same TA commands.

UE 2a determines the multiplexing number of TA command MAC CEs included in MAC PDU 32 which has been received. Since MAC PDU 32 includes two TA command MAC CEs, it is determined that the multiplexing number is two. UE 2a refers to storage section 27 and obtains the granularity of the TA command corresponding to the determined multiplexing number of two. With this operation, for example, UE 2a can calculate a transmission timing adjustment time of the uplink signal of SCS #Y from the TA command received from gNB 1 and the obtained granularity. In the above, UE 2a has been described. The same applies to UE 2b.

As described above, UEs 2a and 2b obtain the granularity of the TA command based on the multiplexing number of TA command MAC CEs included in the MAC PDU. UEs 2a and 2b calculate the transmission timing adjustment time of the uplink signal based on a value obtained by multiplying the TA command received with the TA command MAC CE with the obtained granularity of the TA command. Then, UEs 2a and 2b adjust the transmission timing of the uplink signal based on the transmission timing adjustment time and transmits the transmission timing to gNB 1.

As a result, UEs 2a and 2b can appropriately control the transmission timing of the uplink signal to which the plurality of numerologies is applied. Furthermore, the radio communication system can dynamically change the TA command.

Note that in a case where the plurality of MAC PDUs can be transmitted at the same timing by using both or one of Multiple-Input and Multiple-Output (MIMO) and Carrier Aggregation (CA), gNB 1 may include a single TA command MAC CE in each MAC PDU. UEs 2*a* and 2*b* may obtain the granularity of the TA command based on the number of TA command MAC CEs which have been received at the same timing.

Embodiment 5

Hereinafter, Embodiment 5 will be described. In Embodiment 5, UEs 2*a* and 2*b* obtain a granularity corresponding to a plurality of SCSs used for transmission of uplink signals and select the smallest granularity from among the obtained granularities. UEs 2*a* and 2*b* calculate a transmission timing adjustment time of an uplink signal from the selected granularity and a TA command. Hereinafter, parts different from Embodiment 1 will be described.

Figure 20A:
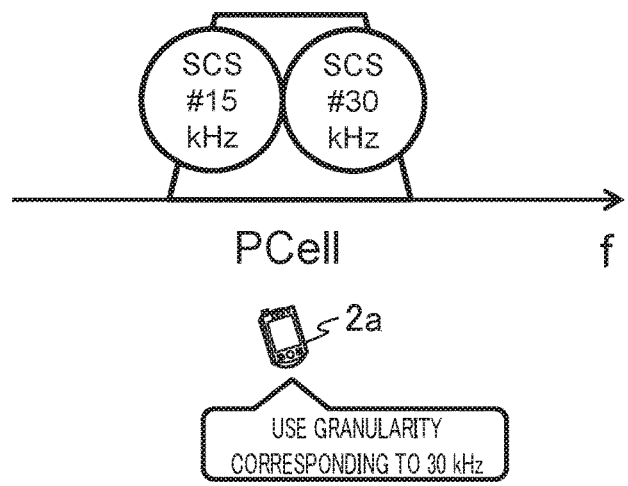
FIG. 20A is a diagram for explaining an exemplary operation of a radio communication system according to Embodiment 5.
Figure 20B:
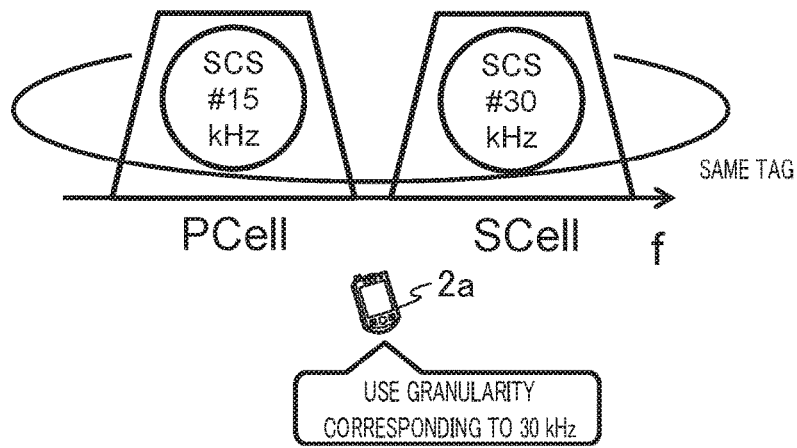
FIG. 20B is a diagram for explaining an exemplary operation of the radio communication system according to Embodiment 5.
Figure 20C:
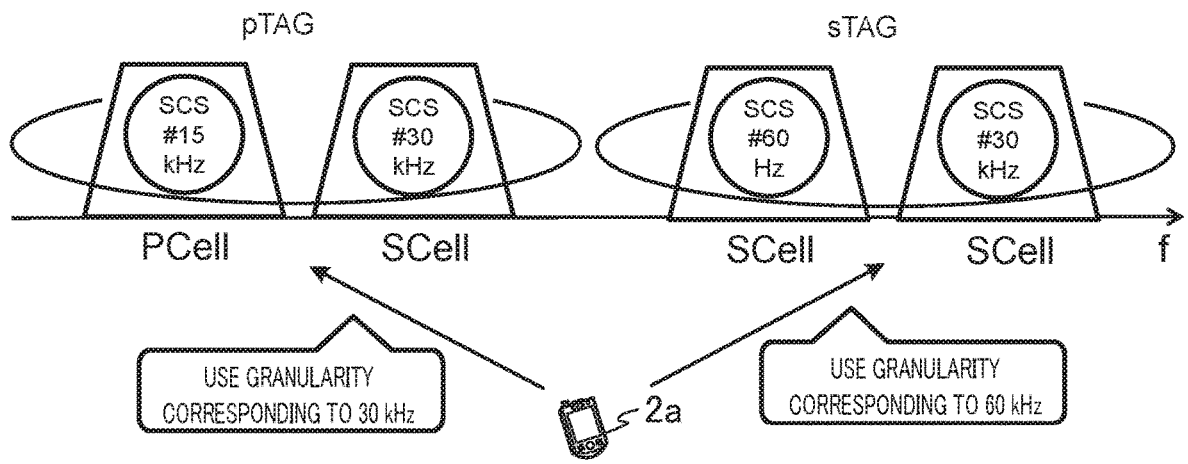
FIG. 20C is a diagram for explaining an exemplary operation of the radio communication system according to Embodiment 5.

FIGS. 20A to 20C are diagrams for explaining an exemplary operation of a radio communication system according to Embodiment 5. In FIG. 20A, UE 2*a* transmits an uplink signal to gNB 1 with a PCell. UE 2*a* sets an SCS of all subcarriers of the PCell to SCS #15 kHz at a certain time and sets the SCS of all the subcarriers of the PCell to SCS #30 KHz at another time. That is, UE 2*a* changes the SCS of the subcarrier of the PCell depending on the time. Note that, UE 2*a* may set the SCS of a part of the subcarriers of the PCell to SCS #15 kHz and may set the SCS of other subcarriers of the PCell to SCS #30 kHz.

UE 2*a* refers to storage section 27 and obtains a granularity corresponding to SCS #15 kHz and a granularity corresponding to SCS #30 kHz. UE 2*a* selects the smallest granularity from among the obtained granularity. In a case of FIG. 20A, UE 2*a* selects the granularity corresponding to SCS #30 kHz. When the TA command is notified by a TA command MAC CE, UE 2*a* calculates a transmission timing adjustment time of the uplink signal by using the selected granularity and the notified TA command.

An OFDM symbol length of the uplink signal of SCS #15 kHz is longer than an OFDM symbol length of the uplink signal of SCS #30 kHz, and a transmission timing adjustment time may be calculated with a coarse granularity. However, UE 2*a* calculates the transmission timing adjustment time according to the granularity of SCS #30 kHz that requires the transmission timing adjustment time based on the fine granularity. With this operation, UE 2*a* can calculate a transmission timing adjustment time of the uplink signal from the TA command received from gNB 1 and the selected granularity.

In FIG. 20B, UE 2*a* transmits the uplink signals to gNB 1 with the PCell and the SCell. UE 2*a* sets the SCS of the subcarrier of the PCell to SCS #15 kHz and sets the SCS of the subcarrier of the SCell to SCS #30 kHz.

In FIG. 20B, the PCell and the SCell belong to the same TAG. Therefore, in a case of FIG. 20B, transmission timings of the uplink signal of the PCell and the uplink signal of the SCell are controlled based on the same TA command.

UE 2*a* refers to storage section 27 and obtains granularities respectively corresponding to SCS #15 kHz and SCS #30 kHz which belong to the same TAG. UE 2*a* selects the smallest granularity from among the obtained granularity. In a case of FIG. 20B, UE 2*a* selects the granularity corresponding to SCS #30 kHz. When the TA command is notified by a TA command MAC CE, UE 2*a* calculates a transmission timing adjustment time of the uplink signal by using the selected granularity and the notified TA command. With this operation, UE 2*a* can calculate a transmission timing adjustment time of the uplink signal from the TA command received from gNB 1 and the selected granularity.

In FIG. 20C, UE 2*a* transmits the uplink signals to gNB 1 with the PCell and three SCells. UE 2*a* sets the SCS of the subcarrier of the PCell to SCS #15 kHz and the SCSs of the subcarriers of the SCells to SCS #30 kHz, SCS #60 kHz, and SCS #30 kHz from the left side in FIG. 20C.

In FIG. 20C, the PCell and the left SCell of the three SCells belong to the same pTAG. Therefore, in a case of FIG. 20C, transmission timings of the uplink signal of the PCell and the uplink signal of the left SCell are controlled based on the same TA command. Furthermore, the SCell in the middle of the three SCells and the right SCell belong to the same sTAG. Therefore, in a case of FIG. 20C, transmission timings of the uplink signal of the middle SCell and the uplink signal of the right SCell are controlled based on the same TA command.

UE 2*a* refers to storage section 27 and obtains granularities respectively corresponding to SCS #15 kHz and SCS #30 kHz which belong to the pTAG. UE 2*a* selects the smallest granularity from among the obtained granularity. In a case of FIG. 20C, UE 2*a* selects the granularity corresponding to SCS #30 kHz. When the TA command is notified by a TA command MAC CE, UE 2*a* calculates a transmission timing adjustment time of the uplink signal by using the selected granularity and the notified TA command. With this operation, UE 2*a* can calculate a transmission timing adjustment time of the uplink signal of the pTAG from the TA command received from gNB 1 and the selected granularity.

Furthermore, UE 2*a* refers to storage section 27 and obtains granularities respectively corresponding to SCS #60 kHz and SCS #30 kHz which belong to the sTAG. UE 2*a* selects the smallest granularity from among the obtained granularity. In a case of FIG. 20C, UE 2*a* selects the granularity corresponding to SCS #60 kHz. When the TA command is notified by a TA command MAC CE, UE 2*a* calculates a transmission timing adjustment time of the uplink signal by using the selected granularity and the notified TA command. With this operation, UE 2*a* can calculate transmission timing adjustment time of the uplink signal of the sTAG from the TA command received from gNB 1 and the selected granularity.

In FIG. 20C, in each of the pTAG and the sTAG, the smallest granularity has been selected. However, the smallest granularity may be selected in the pTAG and the sTAG as a whole. Furthermore, it is not necessary to consider a cell in a Deactive state or BWP. In the above, UE 2*a* has been described. However, the same applies to UE 2*b*.

Furthermore, "the smallest granularity" in storage section 27 may be changed by setting change in an upper layer such as an RRC layer (for example, RRC connection reconfigruation). In this case, UEs 2*a* and 2*b* may select a granularity from among the granularities including "the smallest granularity" from the timing when the change instruction has been received. Furthermore, the granularity may be selected from among the granularities including "the smallest granularity" from the timing of transmitting a confirmation response to the change instruction (L1-ACK or L2-ACK (for example, RLC-ACK) or L3 ACK (for example, RRC connection reconfiguration complete)) (or from timing when confirmation response with respect to that is received).

As described above, UEs 2a and 2b receive the TA command MAC CE including the TA command of the uplink signal from gNB 1. UEs 2a and 2b obtain the granularity corresponding to the SCS applied to the uplink signal from storage section which associates the SCS which can be applied to the uplink signal with the TA command. UEs 2a and 2b select the smallest granularity from among the obtained granularities. UEs 2a and 2b calculate the transmission timing adjustment time of the uplink signal based on a value obtained by multiplying the TA command received from gNB 1 with the selected smallest granularity. Then, UEs 2a and 2b adjust the transmission timing of the uplink signal based on the transmission timing adjustment time and transmits the transmission timing to gNB 1.

As a result, UEs 2a and 2b can appropriately control the transmission timing of the uplink signal to which the plurality of numerologies is applied. In addition, the radio communication system can dynamically change the TA command and suppress the overhead of the data transmission.

(Modification 1)

UEs 2a and 2b may determine the granularity according to QoS or priority of data associated with a logical channel or SCS (numerology). For example, in the MAC layer, it is specified that the logical channel is associated with the SCS based on a signal in the RRC layer. Therefore, UEs 2a and 2b may determine the granularity to be applied according to the QoS or the priority of the data associated with the logical channel or the SCS.

As a result, UEs 2a and 2b can appropriately control the transmission timing of the uplink signal to which the plurality of numerologies is applied. In addition, the radio communication system can dynamically change the TA command and suppress the overhead of the data transmission.

(Modification 2)

UEs 2a and 2b may use the granularity of the SCS of the uplink signal with a high transmission frequency. For example, UEs 2a and 2b measure the transmission frequency of the uplink signal of each SCS and may use the granularity of the SCS with a high frequency.

As a result, UEs 2a and 2b can appropriately control the transmission timing of the uplink signal to which the plurality of numerologies is applied. In addition, the radio communication system can dynamically change the TA command and suppress the overhead of the data transmission. In addition, UEs 2a and 2b can calculate the transmission timing adjustment time of the uplink signal by using the granularity according to the frequency of the SCS.

The embodiments have been described above. In the above, the granularity is selected based on the SCS (using SCS as key). However, the granularity may be selected based on the OFDM symbol length.

(When Multiple TA Commands are Simultaneously Notified to UE)

There is a case where two TA commands are simultaneously notified to UE 2a from gNB 1. For example, there is a case where the TA command MAC CE stores two SCS IDs and two TA commands respectively corresponding to the two SCS IDs. In this case, UE 2a simultaneously receives the two SCS IDs and the two TA commands from gNB 1.

In a case where the two TA commands are simultaneously received, the granularities of the two TA commands may be different from each other. In a case where the granularities of the TA commands are different from each other, UE 2a may perform any one of the following processing.

1. UE 2a selects the smaller granularity from among two granularities. The UE 2a controls the transmission timing of the uplink signal by applying the selected smaller granularity relative to the two TA commands notified from gNB 1. Note that, UE 2a may discard the granularity which has not been selected.

2. UE 2a controls the transmission timing of the uplink signal by respectively applying the corresponding granularities to the two TA commands. Alternatively, UE 2a controls the transmission timing of the uplink signal by preferentially applying one of the two granularities to each of the two TA commands.

3. UE 2a discards the two granularities.

In the above, the single TA command MAC CE includes the two SCS IDs and the two TA commands. However, UE 2a may simultaneously receive two TA command MAC CEs including the single SCS ID and the single TA command.

In the above, it has been described that the TA command MAC CE includes the two SCS IDs and the two TA commands. However, the present invention is not limited to this. The TA command MAC CE may include three or more SCS IDs and three or more TA commands.

In addition, UE 2a may notify gNB 1 of information on the employed (selected) granularity or information on discarded granularity (for example, ACK./NACK, or the like). In the above, UE 2a has been described. The same applies to UE 2b.

(When UE does Not Support Some SCSs)

In some cases, UEs 2a and 2b do not support some of a plurality of existing SCSs. For example, there is a case where UEs 2a and 2b do not support SCS #120 kHz of SCS #15 kHz, SCS #30 kHz, SCS #60 kHz, and SCS #120 kHz and do not support SCS #60 kHz and SCS #120 kHz. When receiving a control signal (MAC CE, RRC signal, or the like) for designating an unsupported SCS, UEs 2a and 2b may discard the control signal. In addition, UEs 2a and 2b may notify gNB 1 that the control signal has been discarded.

(When Granularity Necessary for Transmission Timing Control is Not Specified)

Regarding UEs 2a and 2b, it is not necessary to specify the SCS, requiring the finer granularity than the granularity specified from the NW, from the NW. In other words, UEs 2a and 2b can appropriately operate even when the TA command with coarser granularity than that of the SCS which is actually applied or set is specified.

(Hardware Configuration)

The block diagrams used to describe the embodiments illustrate blocks on the basis of functions. These functional blocks (constituent sections) are implemented by any combination of hardware and/or software. A means for implementing the functional blocks is not particularly limited. That is, the functional blocks may be implemented by one physically and/or logically coupled apparatus. Two or more physically and/or logically separated apparatuses may be directly and/or indirectly (for example, via wires and/or radioly) connected, and the plurality of apparatuses may implement the functional blocks.

Figure 21:
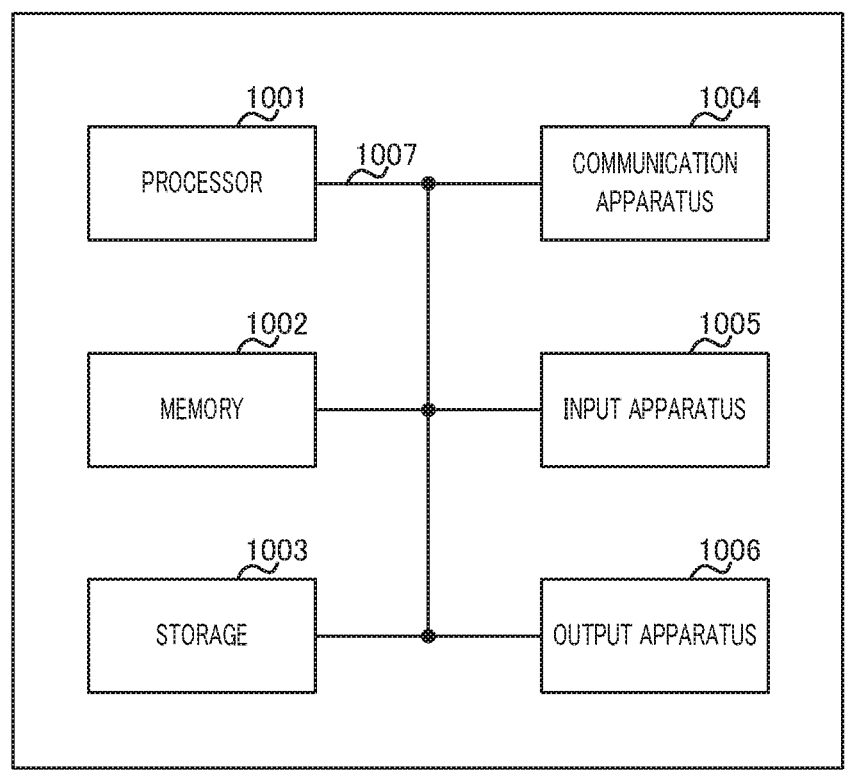
FIG. 21 is a diagram illustrating a hardware configuration of a gNB and an UE according to an embodiment of the present invention.

For example, gNB 1, UEs 2a and 2b, and the like according to an embodiment of the present invention may function as a computer that performs processing of a radio communication method of the present invention. FIG. 21 is a diagram illustrating a hardware configuration of gNB 1 and UEs 2a and 2b according to an embodiment of the present invention. UEs 2a and 2b and gNB 1 as described above may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of gNB 1 and UEs 2a and 2b may include one apparatus or a plurality of apparatuses illustrated in the drawings or may not include some the apparatuses.

The functions of gNB 1 and UEs 2a and 2b are implemented by predetermined software (program) loaded into hardware, such as processor 1001, memory 1002, and the like, according to which processor 1001 performs the arithmetic and controls communication performed by communication apparatus 1004 or reading and/or writing of data memory 1002 and storage 1003.

Processor 1001 operates an operating system to entirely control the computer, for example. Processor 1001 may be composed of a central processing unit (CPU) including an interface with peripheral apparatuses, a control apparatus, an arithmetic apparatus, a register, and the like. For example, timing control section 25 of UEs 2a and 2b and the like may be implemented by processor 1001.

Processor 1001 reads a program (program code), a software module, and data from storage 1003 and/or communication apparatus 1004 to memory 1002 and performs various types of processing according to the program (program code), the software module, and data. As the program, a program for causing the computer to perform at least a part of the operation described in the embodiments is used. For example, the functions of UEs 2a and 2b may be implemented by a control program stored in memory 1002 and operated by processor 1001, and the other functional blocks may also be implemented in the same way. While it has been described that the various types of processing as described above are performed by one processor 1001, the various types of processing may be performed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a Read Only Memory (ROM), an Erasable Programmable ROM (EPROM), an Electrically Erasable Programmable ROM (EEPROM), and a Random Access Memory (RAM). Memory 1002 may be called as a register, a cache, a main memory (main storage apparatus), or the like. Memory 1002 can save a program (program code), a software module, and the like that can be executed to carry out the radio communication method according to an embodiment of the present invention.

Storage 1003 is a computer-readable recording medium and may be composed of, for example, at least one of an optical disk such as a Compact Disc ROM (CD-ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called as an auxiliary storage apparatus. The storage medium as described above may be, for example, a database, a server, or other appropriate media including memory 1002 and/or storage 1003.

Communication apparatus 1004 is hardware (transmission and reception device) for communication between computers through a wired and/or radio network and is also called as, for example, a network device, a network controller, a network card, or a communication module. For example, downlink signal transmission section 11, uplink signal reception section 12, uplink signal transmission section 21, downlink signal reception section 22, and the like may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which makes outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, gNB 1 and UEs 2a and 2b may include hardware, such as a microprocessor, a digital signal processor (DSP), an Application Specific Integrated Circuit (ASIC), a Programmable Logic Device (PLD), and a Field Programmable Gate Array (FPGA), and the hardware may implement a part or all of the functional blocks. For example, processor 1001 may be implemented by at least one of these pieces of hardware.

(Notification of Information and Signaling)

A method of the notification of information is not limited to the aspects or embodiments described in the present specification, and the information may be notified by another method. For example, the notification of information may be carried out by one or a combination of physical layer signaling (for example, Downlink Control Information (DCI) and Uplink Control Information (UCI)), upper layer signaling (for example, Radio Resource Control (RRC) signaling, Medium Access Control (MAC) signaling, notification information (Master Information Block (MIB), and System Information Block (SIB))), and other signals. The RRC signaling may be called an RRC message and may be, for example, an RRC connection setup message, an RRC connection reconfiguration message, or the like.

(Adaptive System)

The aspects and embodiments described herein may be applied to a system using Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), or other appropriate systems and/or to a next-generation system extended based on the above systems.

(Processing Procedure and the Like)

The orders of the processing procedures, the sequences, the flow charts, and the like of the aspects and embodiments described herein may be changed as long as there is no contradiction. For example, elements of various steps are presented in exemplary orders in the methods described herein, and the methods are not limited to the presented specific orders.

(Operation of Base Station)

Specific operations which are described in the specification as being performed by the base station may sometimes be performed by an upper node depending on the situation. It is obvious that various operations performed for communication with a terminal in a network including one network node or a plurality of network nodes including the base station can be performed by the base station and/or a network node other than the base station (examples include, but not limited to, MME or S-GW). Although there is one network node other than the base station in the case illustrated above, a plurality of other network nodes may be combined (for example, MME and S-GW).

(Direction of Input and Output)

Information and the like (refer to items of "information and signal") may be output from the upper layer (or lower layer) to the lower layer (or upper layer). The information, the signals, and the like may be input and output through a plurality of network nodes.

(Handling of Input and Output Information and the Like)

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

(Determination Method)

The determination may be made based on a value expressed by one bit (zero or one), based on a Boolean value (true or false), or based on comparison with a numerical value (for example, comparison with a predetermined value).

(Variations and the Like of Aspects)

The aspects and embodiments described herein may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description herein is made for the purpose of illustration and does not have any restrictive meaning to the present invention.

(Software)

Regardless of whether the software is called as software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a radio technique, such as an infrared ray, a radio wave, and a microwave, the wired technique and/or the radio technique is included in the definition of the transmission medium.

(Information and Signals)

The information, the signals, and the like described herein may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described herein and/or the terms necessary for understanding the present specification may be replaced with terms with the same or similar meaning. For example, the channel and/or the symbol may be a signal. The signal may be a message. The component carrier (CC) may be called as a carrier frequency, a cell, or the like.

("System" and "Network")

The terms "system" and "network" used herein can be interchangeably used.

(Names of Parameters and Channels)

The information, the parameters, and the like described herein may be expressed by absolute values, by values relative to predetermined values, or by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that provides the communication service in the coverage. Furthermore, the terms "base station", "eNB", "cell", and "sector" can be interchangeably used in the present specification. The base station may be called as a fixed station, a NodeB, an eNodeB (eNB), an access point, a femto cell, a small cell, or the like.

(Mobile Station)

The mobile station may be called, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or by some other appropriate terms.

(Meaning and Interpretation of Terms)

As used herein, the term "determining" may encompass a wide variety of actions. For example, "determining" may be regarded as judging, calculating, computing, processing, deriving, investigating, looking up (for example, looking up in a table, a database or another data structure), ascertaining and the like. Furthermore, "determining" may be regarded as receiving (for example, receiving information), transmitting (for example, transmitting information), inputting, outputting, accessing (for example, accessing data in a memory) and the like. Also, "determining" may be regarded as resolving, selecting, choosing, establishing and the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The reference signal can also be abbreviated as an RS and may also be called as a pilot depending on the applied standard. The correction RS may be called as a Tracking RS (TRS), a Phase Compensation RS (PC-RS), a Phase Tracking RS (PTRS), or an additional RS. The demodulation RS and the correction RS may be called by other corresponding names, respectively. The demodulation RS and the correction RS may be specified by the same name (for example, demodulation RS).

The description "based on" used herein does not mean "based only on," unless otherwise specifically stated. In other words, the description "based on" means both of "based only on" and "based at least on."

The "section" in the configuration of each apparatus may be replaced with "means," "circuit," "device," or the like.

The terms "including," "comprising," and modifications of these terms are intended to be inclusive just like the term "having," as long as the terms are used in the present specification or the appended claims. Furthermore, the term "or" used herein or the appended claims is not intended to be an exclusive or.

The radio frame may be constituted by one frame or a plurality of frames in the time domain. The one frame or each of the plurality of frames may be called as a subframe, a time unit, or the like in the time domain. The subframe may be further constituted by one slot or a plurality of slots in the time domain. The slot may be further constituted by one symbol or a plurality of symbols (Orthogonal Frequency Division Multiplexing (OFDM) symbol, Single Carrier-Frequency Division Multiple Access (SC-FDMA) symbol, or the like) in the time domain.

The radio frame, the subframe, the slot, and the symbol indicate time units in transmitting signals. The radio frame, the subframe, the slot, and the symbol may be called by other corresponding names.

For example, in the LTE system, the base station creates a schedule for assigning radio resources to each mobile station (such as frequency bandwidth that can be used by each mobile station and transmission power). The minimum time unit of scheduling may be called as a Transmission Time Interval (TTI).

For example, one subframe, a plurality of continuous subframes, or one slot may be called as a TTI.

The resource unit is a resource assignment unit in the time domain and the frequency domain, and the resource unit may include one subcarrier or a plurality of continuous subcarriers in the frequency domain. In addition, the resource unit may include one symbol or a plurality of symbols in the time domain, and may have a length of one slot, one subframe, or one TTI. One TTI and one subframe may be constituted by one resource unit or a plurality of resource units. The resource unit may be called as a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource assignment unit (for example, one RE only has to be a minimum unit of resource), and the naming is not limited to RE.

The structure of the radio frame is illustrative only, and the number of subframes included in the radio frame, the number of slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

(Variations and the Like of Aspects)

The aspects and embodiments described herein may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description herein is made for the purpose of illustration and does not have any restrictive meaning to the present invention.

INDUSTRIAL APPLICABILITY

An aspect of the present invention is useful for a mobile communication system.

REFERENCE SIGNS LIST 1 gNB
2a, 2b UE
C1 Cell
11 Downlink signal transmission section
12 Uplink signal reception section
13 Reception signal demodulation section
14 Measurement section
15 CC management section
16 TAG determination section
17 Downlink signal generation section
21 Uplink signal transmission section
22 Downlink signal reception section
23 Reception signal demodulation section
24 Measurement section
25 Timing control section
26 Uplink signal generation section
31, 32 MAC PDU

The invention claimed is:
1. A terminal comprising:
a processor that adjusts an uplink transmission timing based on a granularity relative to a largest subcarrier spacing among granularities relevant to subcarrier spacings of a plurality of uplink bandwidth parts in a same timing advance group and based on a timing advance command; and a transmitter that performs uplink transmission according to the uplink transmission timing, wherein the granularity relative to the subcarrier spacing of the uplink bandwidth part becomes small as the subcarrier spacing of the uplink bandwidth part becomes large, and wherein the processor adjusts the uplink transmission timing using a value obtained by multiplying the timing advance command by the granularity relative to the largest subcarrier spacing.

2. The terminal according to claim 1, wherein the plurality of uplink bandwidth parts are in two uplink carriers of a serving cell.

3. The terminal according to claim 2, wherein the granularity relative to the largest subcarrier spacing is smaller than a granularity relative to a subcarrier spacing smaller than the largest subcarrier spacing.

4. The terminal according to claim 1, wherein the granularity relative to the largest subcarrier spacing is smaller than a granularity relative to a subcarrier spacing smaller than the largest subcarrier spacing.

5. A transmission method performed by a terminal, comprising:

adjusting an uplink transmission timing based on a granularity relative to a largest subcarrier spacing among granularities relevant to subcarrier spacings of a plurality of uplink bandwidth parts in a same timing advance group and based on a timing advance command; and performing uplink transmission according to the uplink transmission timing, wherein the granularity relative to the subcarrier spacing of the uplink bandwidth part becomes small as the subcarrier spacing of the uplink bandwidth part becomes large, and wherein the uplink transmission timing is adjusted using a value obtained by multiplying the timing advance command by the granularity relative to the largest subcarrier spacing.

* * * * *